United States Patent [19]

Giordano et al.

[11] 4,188,635

[45] Feb. 12, 1980

[54] INK JET PRINTING HEAD

[75] Inventors: Francis P. Giordano, Brooklyn; Lawrence Kuhn, Mount Kisco; Ramon Lane, Crompond, all of N.Y.; Chen-Hsiung Lee; Gene O. Zierdt, both of San Jose, Calif.

[73] Assignee: International Business Machines Corporation, Armonk, N.Y.

[21] Appl. No.: 839,093

[22] Filed: Oct. 3, 1977

[51] Int. Cl.[2] .................. G01D 15/18

[52] U.S. Cl. .................. 346/75; 346/140 R

[58] Field of Search .................. 346/75, 140 R

[56] References Cited

U.S. PATENT DOCUMENTS

| | | | |
|---|---|---|---|
| 3,747,120 | 7/1973 | Stemme | 346/75 |
| 3,871,004 | 3/1975 | Rittberg | 346/75 |
| 3,900,162 | 8/1975 | Titus et al. | 346/75 X |
| 3,927,410 | 12/1975 | Pimbley | 346/75 |
| 3,940,773 | 2/1976 | Mizoguchi et al. | 346/75 X |
| 4,007,465 | 2/1977 | Chaudhary | 346/140 R |
| 4,034,380 | 7/1977 | Isayama | 346/75 X |

*Primary Examiner*—George H. Miller, Jr.
*Attorney, Agent, or Firm*—Otto Schmid, Jr.

[57] ABSTRACT

An ink jet printing head comprising a head body made from a material having high specific stiffness and the head body includes an ink passage which is kept small to retain the high body stiffness. The ink passage comprises a narrow slot connected with internal holes in the body which lead to ink inlet and exit ports. A nozzle plate having a plurality of orifices is fixed to the front of the head body and a piezoelectric crystal is fixed to the back of the head body. The piezoelectric crystal is kept thin compared to the head thickness, typically on the order of 1/20 to 1/30 of the body thickness, so that the effect of the crystal on the resonant characteristics of the assembly is kept small. The ink jet head provides a plurality of columns or jets of ink which are excited in such a way as to break up into uniformly and equally spaced drops at a fixed distance from the nozzle plate containing the orifices which produce the jets.

10 Claims, 11 Drawing Figures

INK JET PRINTING HEAD

BACKGROUND OF THE INVENTION

One type of electrostatic pressure ink jet system is described in Sweet et al, U.S. Pat. No. 3,373,437, wherein the pressurized electrically conductive fluid is ejected from a plurality of orifices and broken into plural streams of uniform drops. As each drop breaks off from its fluid filament, it may be selectively charged by an associated charge electrode. This system operates binarily, giving a drop either a predetermined charge or leaving it in an uncharged condition. The drops then pass through an electrostatic deflection field so that the charged drops are deflected to a drop catcher or gutter, while the uncharged drops are undeflected and continue past the deflection field to impact a recording medium for printing.

The charge on a drop is established in accordance with the field produced by the charge electrode at the instant the drops break off from the filament. In the apparatus shown in U.S. Pat. No. 3,739,393 to Lyons et al, a plurality of streams is generated by forcing the ink through a set of orifices in an orifice plate and the streams are stimulated to produce drops by vibrating the orifice plate at a point near one end and propagating a traveling wave along the plate to stimulate successive orifices which causes some difference in breakoff distance in the streams and also some phase difference, that is, a difference in time between successive stream breakoffs due to the traveling wave excitation. More uniform drop breakoff is achieved in the apparatus shown in U.S. Pat. No. 3,882,508 by tapering the orifice plate along its length to compensate for the attenuation of the traveling wave along the orifice plate; however, this change does not correct the phase difference.

It is therefore the object of this invention to provide an ink jet head of simplified design which produces a plurality of ink streams each producing uniform drop breakoff and phasing.

SUMMARY OF THE INVENTION

The ideal solution to achieve this objective is to design the ink jet head so that the first natural resonance of the head is at a frequency greater than the operating frequency. However, using existing engineering materials, it is not possible to design an ink jet head within the constraints of our desired dimensions and operating frequency which can operate in this ideal mode.

Briefly according to the invention, the objective is achieved by keeping the resonant frequency of the head as high as possible by using a high specific stiffness material and a design which retains the advantages of this material so that a uniform mode shape is produced at the operating frequency with nodal lines parallel to the ink jet array.

The ink jet head comprises a head body made from a material having a high specific stiffness and the head body includes a slot cummunicating with ink inlet and exit passages and extending to one face of the head body. A nozzle plate having a plurality of orifices is fixed to this face of the head body with the orifices in alignment with the ink slot so that a plurality of ink streams is formed when pressurized ink is introduced into the ink inlet passage. An electromechanical transducer having a thickness small with respect to the thickness of the head body is fixed to the opposite face of the head body so that, when the transducer is energized with a suitable high frequency sine wave, the ink streams are broken up into uniform spaced drops at a fixed distance from the nozzle plate.

DESCRIPTION OF THE PREFERRED EMBODIMENTS

Figure 2A:
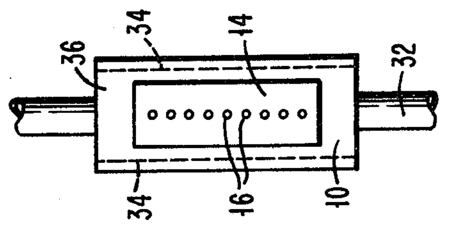
FIGS. 2a, 2b, 2c show respectively, frônt view, right side view and bottom view of an ink jet head assembly utilizing the head body of FIG. 1.
Figure 2B:
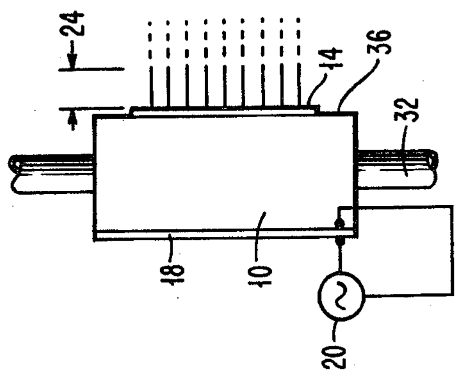
Figure 4:
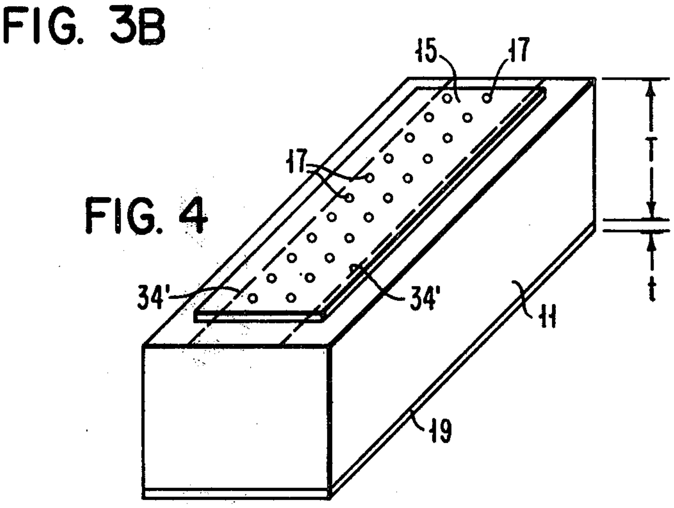
FIG. 4 shows a perspective view of an ink jet head assembly utilizing the head body of FIG. 3.

The ink jet head according to the invention comprises a head body 10 having a nozzle plate 14 containing orifices 16 attached to the front of the body and an electromechanical transducer 18 attached to the back of the body as shown in FIGS. 2 and 4. The purpose of the ink jet head is to provide several columns or jets of fluid such as ink which is excited in such a way as to break up into uniformly and equally spaced drops at a fixed distance from the nozzle plate containing the orifices which produce the jets.

Figure 1A:
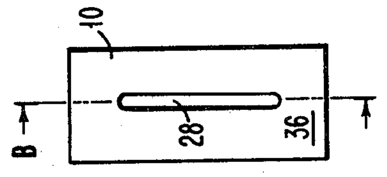
FIGS. 1a, 1b, 1c shows respectively the front view, right side view and a section view along lines A—A of the head body of the ink jet head embodying our invention.
Figure 1B:
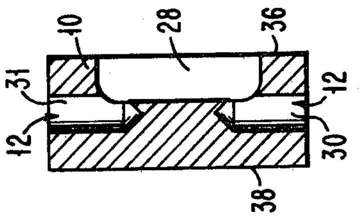
Figure 1C:
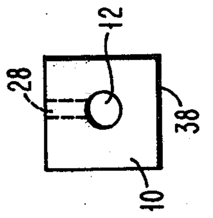

The basic head body as shown in FIG. 1 is a block of material with an ink passage 12 formed in it. Any high specific stiffness material which is chemically compatible with the ink and with other materials in the head may be used. Stainless steel is one material that can be used and ceramic materials such as glass, alumina and silicon carbide may also be used. The specific stiffness is defined by the relation $E/\rho$ where E is Young's Modules of Elasticity and $\rho$ is the density of the material. The specific stiffness for the materials listed above varies from $107\times10^6$ inches for stainless steel to $600\text{-}800\times10^6$ inches for silicon carbide. The ink passage 12 includes a small slot 28 extending to the face 36 of the head body to which the nozzle plate 14 is fixed and ink inlet opening 30 and outlet opening 31 which extend through the end faces of the head body to intersect with ink slot 28. The slot 28 is kept small to retain the high body stiffness. By keeping the dimensions of the block small and compact, the resonant frequencies are kept high and resonances in the frequency range of interest, typically 100 kilohertz to 200 kilohertz, are minimized. Although the shape of the head body is shown as rectangular, other shapes can be used as well, such as cylindrical with the faces either parallel or perpendicular to the cylindrical axis.

The electromechanical transducer is attached to the back of the head body and the thickness of the transducer is kept thin compared to the head thickness. The preferred electromechanical transducer is a piezoelectric crystal and a suitable transducer is the lead zirconate-lead titanate ceramic sold under the tradename of PZT by Vernitron Piezoelectric Division, Bedford, Ohio. By utilizing a thin crystal, the effect of the crystal on the resonant characteristics of the assembly is kept small. The stiffness and mass of the head body are so much greater than those of the crystal that the resonant characteristics are essentially those of the head body alone.

Figure 5:
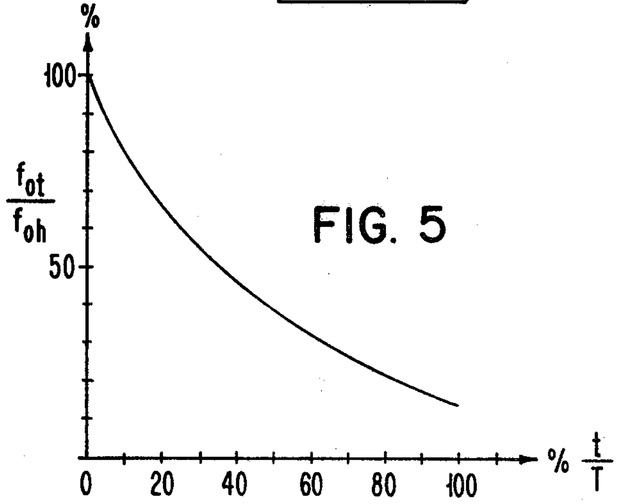
FIG. 5 is a graph which shows the percent reduction in the first resonant frequency of the head as a function of the thickness ratio of the transducer and head body.

The ratio in percent of the first resonant frequency of the total head $f_{ot}$ and the first resonant frequency of the head body alone $f_{oh}$ is plotted in FIG. 5 versus the thickness ratio t/T for a steel head body and a PZT4 crystal. Similar curves can be drawn for other material combinations. This figure illustrates the percent reduction in the first resonant frequency of the head due to the presence of the crystal plate versus the thickness ratio of the crystal and head body. In order to keep the reduction within 10%, it can be seen from FIG. 5 that the thickness ratio should be less than 5%. Typical dimensions for an ink jet head are 0.5 inch for the head body thickness T and 0.020 inch for the crystal thickness t. This corresponds to a thickness ratio t/T of 4% and this design produces less than a 10% reduction in the first resonant frequency of the head.

Figure 2C:
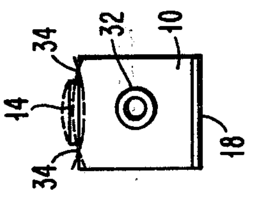

As shown in FIG. 2, the head body has a nozzle plate 14 bonded to its front surface 36 so that the orifices 16 are in alignment with the narrow slots 28 in the head body. The nozzle plate can be bonded to the head body by any suitable process which produces a uniform rigid bond line and is chemically inert to the ink so that the nozzle plate is forced to follow the vibratory motion of the head body as shown dotted in FIG. 2C. Ink inlet port 32 is fitted within internal hole 30 and a piezoelectric crystal 18 is bonded to the back surface 38 of the head body. The crystal 18 can be bonded to the head body by any suitable process which is capable of producing a rigid bond that is thin with respect to the crystal thickness to promote the maximum transfer of energy from the crystal to the head body. The preferred bonding material is a suitable epoxy bonding material.

A sinusoidally varying voltage from source 20 is applied to the crystal 18 to provide the excitation to the jets 22 so that the jets break up at a fixed distance 24 from the nozzle plate into a series of uniformly and equally spaced drops 26. The drive from crystal 18 produces a vibration at the face of the head body as shown dotted in FIG. 2. It is important to the production of drop breakoff at a fixed distance 24 from the nozzle that the nodal points 34 of the vibration be parallel to the row of orifices in nozzle plate 14. The ink jet head shape and dimensions are chosen to operate at a particular frequency at which the head is driven so that the proper vibrational mode is produced as shown in FIG. 2.

Figure 3A:
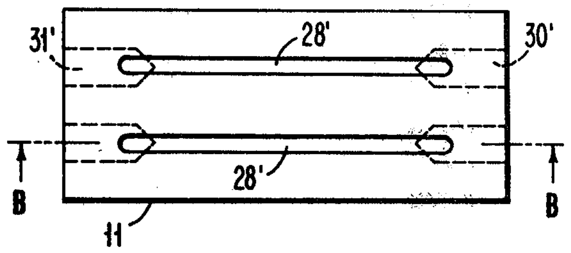
FIGS. 3a, 3b, 3c show respectively, front view, right side view and a section view along lines A—A of an alternate head body.
Figure 3C:
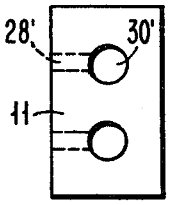
Figure 3B:
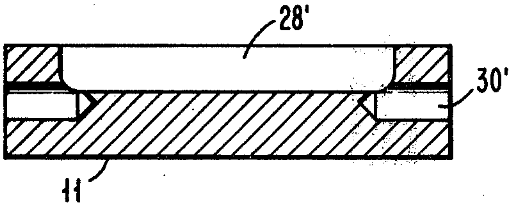

When multiple columns of jets are desired, each is provided with a separate slot 28 behind its orifices as shown in FIG. 3. The head body 11 has two ink slots 28' and ink inlet opening 30' and exit opening 31' which intersect with each ink slot 28'. The assembled head has a nozzle plate 15 having two rows of orifices 17. The nozzle plate is fixed to head body 11 so that the rows of orifices 17 are aligned with the ink slots 28'. This structure maintains the high stiffness of the assembly and produces the nodal points 34' parallel to the rows of orifices as shown in FIG. 4 so that, when transducer 19 is excited by a suitable sine wave voltage, uniform breakoff can also be obtained in each of the multiple columns of jets provided in this head. This structure has the advantage relative to other multi-column heads where a single cavity serves all of the columns. In these heads the nozzle plate covering this large cavity becomes a relatively weak diaphragm, thereby introducing complex resonant characteristics.

Several other advantages of this head are not related to its resonant characteristics. One advantage is that the piezoelectric crystal is kept out of contact with the ink, thereby eliminating the need to pass crystal drive current through the ink and preventing chemical attack of the crystal, crystal electrodes or crystal bonding material by the ink. Another advantage is that gaskets and "O" rings are not required to seal the ink passages and assembly screws are eliminated. A third advantage is that the small ink passages permit high ink velocities through the passage when in a flow-through or flushing mode, thereby facilitating removal of air bubbles or contaminants when they affect operation, which is typically during the startup mode. An additional advantage is that the small physical size and weight of the head makes it desirable for incorporating it into a complete ink jet print head assembly which includes the head described plus charge plates, deflection plates and gutters.

While the invention has been particularly shown and described with reference to a preferred embodiment thereof, it will be understood by those skilled in the art that various changes in the form and details may be made therein without departing from the spirit and scope of the invention.

What is claimed is:

1. A multi-nozzle ink jet head comprising:

a head body comprising a member having opposed faces separated by a predetermined distance, said head body having an ink inlet passage and at least one ink slot communicating with said inlet passage and extending to only one of the faces of the head body;

a nozzle plate having a plurality of orifices therein; said nozzle plate being fixed to said one face of said head body with its orifices in alignment with said ink slot so that a row of ink jet streams is formed when pressurized ink is introduced into said ink inlet passage;

an electromechanical transducer fixed to the opposed face of said head body from said one face; said electromechanical transducer having a thickness small with respect to said predetermined distance; and means for continuously energizing said electromechanical transducer to vibrate said head to cause the ink jet streams to break up into uniform equally spaced drops at a fixed distance from the nozzle plate.

2. The invention according to claim 1 wherein said electromechanical transducer thickness is less than about 1/20 said predetermined distance.

3. The invention according to claim 1 wherein said head body has a plurality of ink slots and said nozzle plate has a plurality of rows of orifices with each row of orifices in alignment with one of said ink slots.

4. The apparatus of claim 2 wherein said electromechanical transducer comprises a piezoelectric crystal.

5. The ink jet of claim 1 wherein said head, when energized, produces a vibrational mode at said one face having its nodal lines parallel to the row of ink jet streams.

6. A multi-nozzle ink jet head comprising:

a head body comprising a member made from a material having high specific stiffness and having opposed faces separated by a predetermined distance, said head body having an ink inlet passage and at least one ink slot communicating with said inlet passage and extending to only one of the faces of the head body;

a nozzle plate having a plurality of orifices therein; said nozzle plate being fixed to said one face of said heady body with its orifices in alignment with said ink slot so that a row of ink jet streams is formed when pressurized ink is introduced into said ink inlet passage;

an electromechanical transducer fixed to the opposed face of said head body from said one face; said electromechanical transducer having a thickness small with respect to said predetermined distance; and means for continuously energizing said eletromechanical transducer to vibrate said head at a predetermined operating frequency to cause the ink jet streams to break up into uniform equally space drops at a fixed distance from the nozzle plate.

7. The invention according to claim 6 wherein said electromechanical transducer thickness is less than about 1/20 said predetermined distance.

8. The invention according to claim 6 wherein said head body has a plurality of ink slots and said nozzle plate has a plurality of rows of orifices with each row of orifices in alignment with one of said ink slots.

9. The apparatus of claim 7 wherein said electromechanical transducer comprises a piezoelectric crystal.

10. The ink jet head of claim 1 wherein said head, when energized at said operating frequency, produces a vibrational mode at said one face having its nodal lines parallel to the row of ink jet streams.

* * * * *